Nov. 7, 1950     J. L. FLETCHER     2,529,380
REFRIGERATOR CABINET

Filed Jan. 10, 1946     2 Sheets-Sheet 1

INVENTOR.
James Loren Fletcher
BY

Nov. 7, 1950  J. L. FLETCHER  2,529,380
REFRIGERATOR CABINET
Filed Jan. 10, 1946  2 Sheets-Sheet 2

INVENTOR.
James Loren Fletcher
BY Herman Reed

Patented Nov. 7, 1950

2,529,380

UNITED STATES PATENT OFFICE 2,529,380

REFRIGERATOR CABINET

James Loren Fletcher, Fayetteville, N. Y., assignor to Carrier Corporation, Syracuse, N. Y., a corporation of Delaware Application January 10, 1946, Serial No. 640,165

4 Claims. (Cl. 220—9)

This invention relates to refrigeration cabinets and, more particularly, to a cabinet structure including a breaker strip disposed about an opening in the storage compartment to close the space between the inner liner forming the storage compartment and the outer decorative shell, and improved means for locking the breaker strip in desired position.

The chief object of this invention is to provide a refrigeration structure including improved means for locking a breaker strip in desired position.

An object of this invention is to provide a refrigeration structure including a trim member for yieldably locking a breaker strip in desired position, the trim member carrying means to attach it in place in the assembly.

A further object is to provide a refrigeration structure including a trim member for yieldably locking a breaker strip in place, the trim member carrying a clip of specific contour adapted to cooperate with means on the exterior shell of the structure to attach the trim member in place in the assembly.

A still further object is to provide a new and improved trim member for use in a refrigeration structure.

A still further object is to provide a method of assembling and locking a breaker strip in place in a refrigeration structure.

This invention relates to a refrigeration structure which comprises an exterior decorative shell, and an inner liner forming a storage compartment disposed in spaced relation to the exterior shell. Insulation material is disposed between the shell and the liner. A breaker strip is disposed in position to close the space between the exterior shell and the interior liner. A trim member is provided to hold the breaker strip in desired position. The trim member carries clip means adapted to cooperate with retaining means formed on the shell to lock the breaker strip in desired position.

The attached drawings illustrate a preferred embodiment of the invention, in which—

Figure 1:
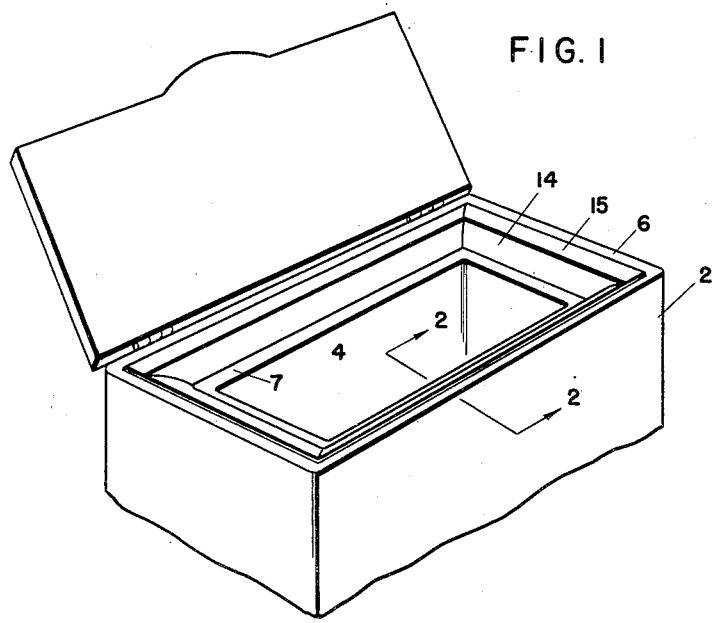
Figure 1 is an isometric view of a freezer cabinet embodying my invention.

Referring to the drawings; there is shown a freezer cabinet 2 composed of an exterior shell 3 and an inner liner 4. Liner 4 is disposed in spaced relation to shell 3 and insulation material 5 of any suitable type, such as corkboard, fibrous material, mineral wool, or glass wool, is disposed between the shell 3 and liner 4 to insulate the storage compartment from the ambient air.

Shell 3 is provided with an inwardly extending flange 6. Liner 4 is provided with an outwardly extending flange 7 which extends toward flange 6 of shell 3. A vapor barrier 8 of any suitable type is disposed between the insulation material 5 and the flanges 6 and 7. A suitable sealing compound 9 is disposed at the junctures of flanges 6 and 7 with barrier 8 to seal the spaces between the insulation material and the liner and shell against penetration of moisture.

Figure 2:
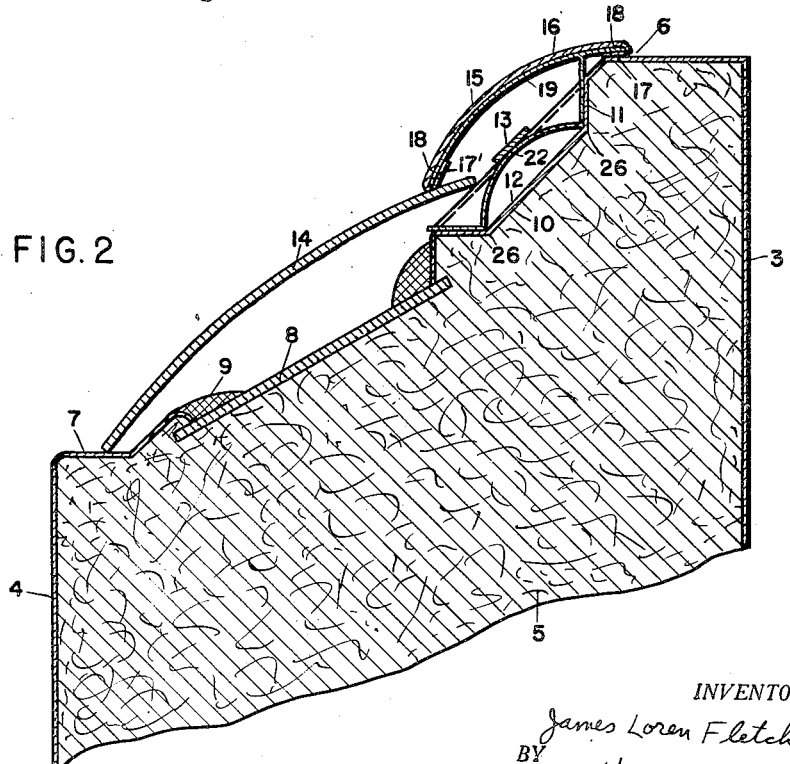
Figure 2 is a sectional view taken on the line 2—2 of Figure 1.
Figure 3:
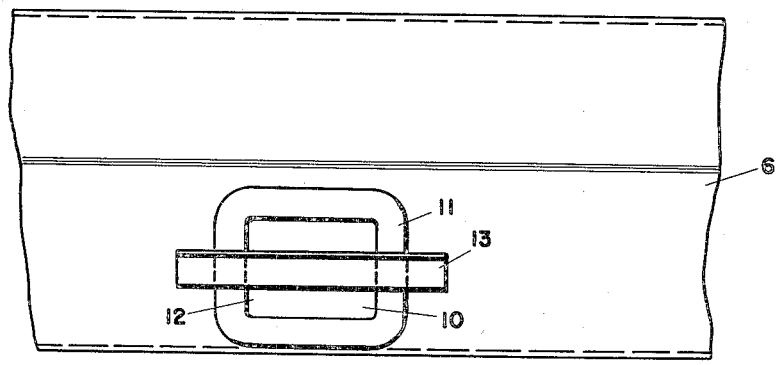
Figure 3 is a plan view illustrating the retaining means formed in the flange of the exterior shell.
Figure 4:
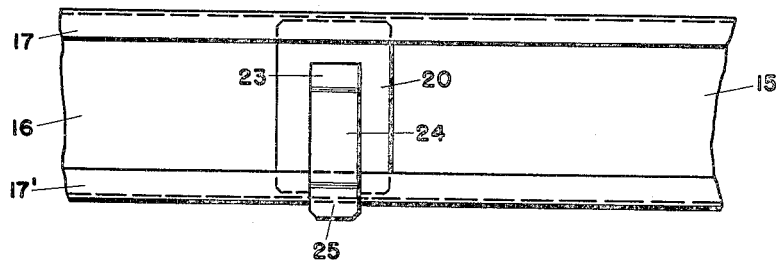
Figure 4 is a bottom plan view of the trim member illustrating the fastening means carried thereby.

Flange 6 may be provided with a plurality of indentations or recesses 10. The indentations 10 are best shown in Figure 2. The indentations include downwardly extending walls 11 and a base 12 as hereinafter explained. Bridging members 13 in the form of bars or straps are disposed over the indentations 10 and are secured in any suitable manner to flange 6 preferably by welding or soldering thereto.

A breaker strip 14 is disposed in the structure and extends between flange 6 and flange 7; breaker strip 14 closes the space between the flanges and conceals the vapor barrier and sealing compound to improve the appearance of the finished structure. In addition, it serves as a nonconductive member connecting the shell and the liner.

Breaker strip 14 is held in desired position by means of decorative trim member 15. Trim member 15 extends over a portion of breaker strip 14 and flange 6 and is adapted to be removably secured to flange 6, for example, to hold breaker strip 14 in fixed position. Trim member 15 includes a decorative arc-shaped body portion 16 having flanges 17 and 17' extending inwardly therefrom to form, in cooperation with the inner surface of portion 16, sockets 18 for the reception of fastening means such as a clip 19.

Figure 5:
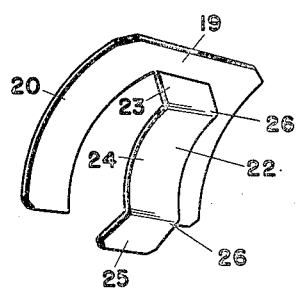
Figure 5 is an isometric view of the fastening means.

Trim member 15 carries clip 19 to attach it to flange 6. Clip 19 includes a body portion 20 of similar contour to body portion 16 of trim member 14, the edges of portion 20 extending within the sockets 18. Any suitable means may be used to secure the clip member in fixed position adjacent trim member 15. Preferably, clip 19 is peened in fixed position. Clip 19 carries a resilient tongue member 22 as shown in Figures 2 and 5. Tongue member 22 includes a downwardly extending portion 23, an arc-shaped portion 24 and an outwardly extending portion 25. The junctures of portions 23 and 25 with arc-shaped portion 24 form blade-like members 26 adapted to fit in indentation 10 and to engage opposite walls 11 thereof. The arc-shaped portion 24 engages the under surface of bridging member 13. In effect, three points of locking engagement are provided to attach trim member 15 in place in the structure. It will be appreciated tongue 22 of clip 19 is formed of resilient metal or the like to permit it to be inserted or snapped into indentation 10 and removed therefrom if it be desired to disassemble the structure.

The structure is assembled by disposing shell 3 and liner 4 in spaced position with insulation material 5 therebetween. Vapor barrier 8 is then disposed in position adjacent flanges 6 and 7 and sealing compound 9 placed over the junctures of the flanges with the vapor barrier to seal the assembly against penetration of moisture into any spaces which may exist between insulation material 5 and shell 3 and liner 4.

Breaker strip 14 is then disposed in position in the structure extending between flanges 6 and 7 and closing the opening therebetween. Trim member 15 carrying clip 19 is then fixed in the assembly by snapping the tongue 22 of clip 19 into indentation 10 under strip member 13. When the clip is fitted in indentation 10, members 26 nest against opposite walls 11 adjacent base 12 of indentation 10 (see Figure 2) while arc-shaped portion 24 of the clip engages the under side of bridging member 13. A plurality of points of locking engagement between the tongue 22 and the retaining means of flange 6 are provided assuring the retention of trim member 15 in the assembly to hold breaker strip 14 in desired position. The attaching member 22 of clip 19 is resilient permitting the trim member 15 to be yieldably locked in position in the structure.

This invention provides a simple and inexpensive means of securely holding a breaker strip in position in a refrigeration structure. The means so provided yieldably lock a trim member in place in the assembly thus holding the breaker strip in desired position to extend between the walls of the structure and to close the opening therebetween. Yieldably locking the breaker strip in desired position permits ready and speedy assembly of the various elements thus considerably reducing the cost of manufacture. In addition my invention provides a new and improved clip member for yieldably locking the trim member in place in the assembly.

While I have described and illustrated a preferred embodiment of my invention, it will be understood my invention is not limited thereto since it may be otherwise embodied within the scope of the following claims.

I claim:

1. In a refrigeration structure, the combination of a shell having an inwardly extending flange, a liner having an outwardly extending flange, the shell and the liner being disposed in spaced relation to one another, insulation material disposed between the shell and the liner, a plurality of indentations formed in the shell flange, bridging members disposed over said indentations and attached to said flange, a breaker strip disposed over and closing the space between said flanges, a trim member extending over a portion of said breaker strip adapted to hold the breaker strip in desired position, said trim member having its edges turned inwardly to form a plurality of sockets, clip members secured to the trim member, each clip member having a body, the edges of said body being disposed in said sockets to secure the clip member to the trim member, said clip body having a resilient tongue extending therefrom within the indentation, the tongue including spaced members nesting against opposite walls of the indentation, and a member resiliently engaging the under side of the bridging member, said tongues yieldably locking the trim member in place in the structure.

2. In a refrigerator cabinet, the combination of a shell having an inwardly extending flange, a plurality of indentations in said flange, bridging members disposed over the indentations in said flange, said members being attached to the flange, an inner liner spaced from said shell, a breaker strip extending between the liner and the shell to close the opening therebetween, a trim member holding the breaker strip in desired position, said trim member including an ornamental body portion having an arc-shaped contour, flanges extending inwardly from opposite sides of said body portion, said flanges cooperating with the inner surface of the body portion to form sockets for the reception of a clip member, a clip member having a body portion similar in contour to the body portion of the trim member, the edges of the clip body portion fitting within said sockets, a resilient tongue extending from said clip body portion, said tongue having a first portion extending downwardly, an arc-shaped second portion and a third portion extending outwardly, the arc-shaped portion and the junctures between said portions engaging the sides of the indentations and the lower side of the bridging member to hold the trim member in place.

3. In a refrigerator cabinet, the combination of a shell having an inwardly extending flange, a plurality of indentations in said flange, bridging members disposed over the indentations in said flange, said members being attached to the flange, an inner liner spaced from said shell, a breaker strip extending between the liner and the shell to close the opening therebetween, a trim member holding the breaker strip in desired position, said trim member including an ornamental body portion having an arc-shaped contour, flanges extending inwardly from opposite sides of said body portion, said flanges cooperating with the inner surface of the body portion to form sockets for the reception of a clip member, a clip member having its edges disposed within said sockets, the flanges forming the sockets being peened to retain the clip member in position, said clip member having a resilient tongue extending therefrom, said tongue having a first portion extending downward, an arc-shaped second portion and a third portion extending outward, the junctures between said portions engaging the sides of the indentations and the arc-shaped portion engaging the under side of the bridging member to hold the trim member in place.

4. In a refrigeration cabinet, the combination of a shell having an inwardly extending flange, a plurality of indentations formed in said flange, bridging members disposed over said indentations, said members being attached to said flange, an inner liner spaced from said shell, a breaker strip extending between the liner and the shell to close the opening therebetween, a trim member securing said breaker strip in desired position, and clip means carried by said trim member adapted to fit within the indentations over the bridging members to hold the trim member in place in the structure, said clip means comprising an arc-shaped body portion attached to the trim member, a resilient tongue extending from the body portion, said tongue including a downwardly extending first portion, an arc-shaped second portion and an outwardly extending third portion, the arc-shaped portion being adapted to engage the under side of a bridging member, the junctures of the first and third portions with the arc-shaped portion forming blade-like portions adapted to nest at the juncture of the indentation base and its walls, engagement between the tongue and the walls of the indentation yieldably locking the tongue in the indentation.

JAMES LOREN FLETCHER.

REFERENCES CITED

The following references are of record in the file of this patent:

UNITED STATES PATENTS

| Number | Name | Date |
| --- | --- | --- |
| 1,155,149 | Hathorne | Sept. 28, 1915 |
| 2,123,403 | Connelly | July 12, 1938 |
| 2,215,192 | Read | Sept. 17, 1940 |
| 2,217,574 | Tinnerman | Oct. 8, 1940 |
| 2,225,394 | Tinnerman | Dec. 17, 1940 |
| 2,329,754 | Goulooze | Sept. 21, 1943 |
| 2,348,645 | Quinn | May 9, 1944 |
| 2,370,446 | Buchanan | Feb. 27, 1945 |